United States Patent [19]

Gould, deceased et al.

[11] 3,987,150
[45] Oct. 19, 1976

[54] PRODUCTION OF AMMONIUM NITRATE

[75] Inventors: Lawrence Peabody Gould, deceased, late of Syracuse, N.Y., by Josephine Tremain Gould, executrix; Robert Joel Hoffman, Liverpool, N.Y.

[73] Assignee: Allied Chemical Corporation, Morris Township, N.J.

[22] Filed: Nov. 20, 1975

[21] Appl. No.: 633,769

Related U.S. Application Data

[63] Continuation-in-part of Ser. No. 528,749, Dec. 2, 1974, abandoned.

[52] U.S. Cl. ............................... 423/396; 423/386; 423/398
[51] Int. Cl.² ........................................... C01C 1/18
[58] Field of Search ............ 423/386, 396, 398, 507

[56] References Cited
UNITED STATES PATENTS 2,916,353  12/1959  Lovell et al. ...................... 423/398

FOREIGN PATENTS OR APPLICATIONS 459,245  7/1970  Japan ................................. 423/396
844,789  8/1960  United Kingdom ................. 423/396

Primary Examiner—G. O. Peters
Attorney, Agent, or Firm—Anthony J. Stewart; Jack B. Murray, Jr.

[57] ABSTRACT

A process for the production of ammonium nitrate is provided wherein ammonium chloride is contacted with a gaseous stream containing nitrogen dioxide, in an inert liquid dispersing medium.

7 Claims, No Drawings

PRODUCTION OF AMMONIUM NITRATE

CROSS-REFERENCE TO RELATED APPLICATIONS

This application is a continuation-in-part of our U.S application Ser. No. 528,749. "Production of Ammonium Nitrate," filed Dec. 2, 1974, now abandoned.

BACKGROUND OF THE INVENTION

1. Field of the Invention

This invention relates to the preparation of ammonium nitrate and more specifically to the preparation of ammonium nitrate by the reaction of ammonium chloride and nitrogen dioxide.

2. Description of the Prior Art

In the preparation of ammonium nitrate, processes such as disclosed in B. B. Vadil'ev, Ya. A. Ravdin and E. J. Luk'yanova, "Reaction Between Ammonium Chloride and Nitric Acid", J. Gen. Chem. (USSR) 7, 2913–18 (1937), 32 C.A. 4897 (1938) have been developed wherein nitric acid is reacted with ammonium chloride. However, those processes wherein the reaction is carried out with the use of nitric acid or in aqueous solution cause serious corrosion problems and necessitate the use of expensive corrosion-resistant equipment.

While, as in U.S. Pat. No. 1,965,400, it has been proposed to minimize the corrosion problems by carrying out the reactions under anhydrous or substantially anhydrous conditions, here again certain practical difficulties are presented. For example, if it be attempted to use nitrogen peroxide vapors which are passed over or through a solid particulate mass of ammonium chloride as in U.S Pat. No. 1,965,400, the reaction proceeds very slowly unless enough moisture is present to give rise to corrosion problems. Indeed, whether the ammonium chloride be disposed in a stationary, granular bed with the nitrogen oxides passed therethrough in gaseous form or the contact between the solid chloride and the gases is brought about by a fluidized solids technique, there is a strong tendency for the solid particles to stick together and form a solid mass long before the reaction is completed.

Moreover, processes which have been developed for the conversion of alkali metal and alkaline earth metal chlorides to the corresponding nitrates by reaction with nitrogen oxide are not readily adaptable to the production of ammonium nitrate due to the rapid decomposition which ammonium nitrate undergoes. Exemplary of such alkai metal/alkaline earth metal processes are those disclosed by U.S. Pat. Nos. 1,604,660; 1,658,519; 1,717,951; 1,875,014; 2,057,957; 2,916,353; 2,963,345; and 3,211,525. See also Ann. Phil. 9, 355 (1817); C. W. Whittaker, F. O. Lundstrom and A. R. Mevz, "Preparation of Potassium Nitrate from Solid Potassium Chloride and Nitrogen Peroxide," Ind. Eng. Chem. 23. 1410 (1931); J. W. Mellor, A Comprehensive Treatise on Inorganic and Theoretical Chemistry, Vol. VIII, Suppl. II, N, Part II, page 420 (1967); H. Tramm and H. Yelde, "Spontaneous Decomposition of Ammonium Nitrate Melts", Angew. Chem. 47, 782-3 (1934), C.A. 29, 699 (1935); B. Rozman, "Thermal Decomposition of Ammonium Nitrate in the Presence of Chlorides", Zhur. Neorg. Klum, 6, 783–5 (1961), C.A. 56, 3107 (1962); J. Van R. Smit," Chloride — Catalyzed Destruction of Ammonium Nitrate in Nitric Acid Medium", Chemistry and Industry, 2018 (Dec. 5, 1964); "Synthetic Saltpeter Scores," Chem. Week 97, p. 35–38 (July 24, 1965); European Chemical News, p. 34 (Technical Week Section) (Jan. 26, 1968).

SUMMARY OF THE INVENTION

According to the present invention, a process for the production of ammonium nitrate is provided wherein ammonium chloride is contacted in an inert, liquid dispersing medium with a gaesous stream containing nitrogen dioxide. Preferably, the liquid dispersing medium comprises a normally liquid member selected from the group consisting of halogenated hydrocarbons, aliphatic hydrocarbons, aromatic hydrocarbons such as benzene, and alkly-substituted benzene, ligroin, and mixtures thereof.

Surprisingly, the process of the present invention has been found to effect a high conversion of ammonium chloride to high purity ammonium nitrate, while avoiding the corrosion problems which arise through the use of aqueous absorption systems, and at the same time avoiding the handling difficulties which arise as a result of the use of prior art methods wherein solid ammonium chloride is contacted with gaseous nitric oxide. Moreover, the present invention obtains rapid conversion of ammonium chloride to ammonium nitrate without the need for employing a finely granulated ammonium chloride.

The reaction between ammonium chloride and nitrogen dioxide to form ammonium nitrate and nitrosyl chloride may be illustrated by reference to the following equation:

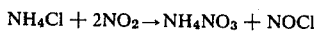

$$NH_4Cl + 2NO_2 \rightarrow NH_4NO_3 + NOCl$$

The ammonium nitrate so produced finds widespread use in the manufacture of explosives and fertilizers. The by-product nitrosyl chloride produced according to the process of the present invention may be recovered and either oxidized to produce $NO_2$ and $Cl_2$ or employed in the manufacture of caprolactam such as by the photochemical process disclosed in P. Hulme and P. Turner, "Light Paves Way to Higher Yields of Caprolactam at Lower Costs", 75 Chem. Eng., 80–82 (Mar. 25, 1968).

DETAILED DESCRIPTION OF THE INVENTION

According to the present invention, ammonium nitrate is produced by a process which comprises contacting ammonium chloride with a gaseous stream containing nitrogen dioxide, in an inert liquid dispersing medium. Preferably, the liquid dispersing medium comprises a member selected from the group consisting of halogenated hydrocarbons, aliphatic hydrocarbons, aromatic hydrocarbons (such as benzene and alkyl-substituted benzene), ligroin and mixtures thereof which is a liquid under reaction conditions.

The liquid dispersing medium selected for use must be inert, that is, the liquid should not react with any component of the reaction system so as to adversely affect the yield of ammonium nitrate which is obtained.

The halogenated hydrocarbons which are suitable for use as liquid dispersing medium in the practice of the present invention are hydrocarbons having at least one hydrogen atom substitued by a halogen atom, i.e. chlorine, bromine, fluorine or iodine. Preferred as halogenated hydrocarbons are members selected from the group consisting of halogenated aliphatic hydrocarbons having from 1 to 12 carbon atoms, and more preferably from 1 to 5 carbon atoms, and boiling at a temperature of greater than about 30°C, and more preferably greater than about 50°C. Exemplary halogenated hydrocarbons which may be employed include carbon tetrachloride, methylene chloride, trichloromonofluoromethane, chloroform, tetrachlorodifluoroethane, trichlorotrifluoroethane ($CCl_3CF_3$), dichlorotetrafluoroethane ($CClF_2CClF_2$), pentachloroethane, dichlorotrifluoroethane, trichloroethane, dichloroethane, perchlorethylene, 3-(chloromethyl)heptane, 1,1-dichloroheptane, 1-fluoroheptane, 1-iodoheptane, 1-bromopentane, 1-bromo-4-methylpentane, 2-chloropentane, 4-chloro-2,2-dimethylpentane, 1-chloro-5-fluoropentane, 1,5-dichloropentane, 1-bromodecane, 1-bromo-10-fluorodecane, 1-chlorododecane, 4-chloro-4-methyloctane, 1-chloro-8-fluorooctane, 1-bromooctane and mixtures thereof.

The aliphatic hydrocarbons which may be employed as liquid dispersing medium include those having from 6 to 12 carbon atoms, and more preferably from about 6 to 9 carbon atoms. They may be straight chain, branched chain or cylic. Preferred as aliphatic hydrocarbons are saturated aliphatic hydrocarbons which have a boiling point of greater than about 30°C, and more preferably greater than about 50°C. Examples of aliphatic hydrocarbons which may be employed in the present invention are straight-chain saturated aliphatic hydrocarbons such as n-hexane, n-heptane and n-decane, branched-chain saturated aliphatic hydrocarbons such as 3-methylheptane, 4-ethylheptane. 3-methylpentane, 3,3-dimethylpentane, 3-ethyl-3-methylpentane, 2,7-dimethyloctane, and 2,3-dimethylheptane, and cyclic aliphatic hydrocarbons, such as cyclohexane.

The alkyl-substituted benzenes which may be employed in the present invention are substiued benzenes having a total of from 7 to 18, preferably 7 to 12 carbon atoms (i.e., having one or more side chains containing a total of from 1 to 12, preferably of from 1 to 6 carbon atoms). Exemplary of such alkyl-substituted benzenes are: toluene, the xylenes, e.g. m-xylene and p-xylene, p-ethyltoluene; m-ethylisopropylbenzene; and m-isobutyltoluene.

The ligroin which may be employed in the present invention as the liquid dispersing medium is a liquid obtained as by-product in the production of petroleum by the distillation of petroleum oils and may generally be described as a saturated, volatile fraction of petroleum boiling within the range of from about 20° to 135°C.

The highest yields of ammonium nitrate according to the process of the present invention are obtained when the liquid dispersing medium selected for use is substantially non-polar (e.g., benzene and saturated aliphatic hydrocarbons, such as n-hexane, n-heptane, iso-octane, cyclohexane, and the like).

Gaseous streams containing nitrogen dioxide which may be employed in the practice of the present invention may be obtained from any process which produces nitrogen oxides, such as by the air oxidation of ammonia, the thermal decomposition of nitric acid or oxidation of nitric oxide, among other methods. While commercially produced gaseous streams containing nitrogen dioxide obtained by ammonia oxidation generally contain from about 8 to 10 percent by volume $NO_2$, the concentration of $NO_2$ in the nitrogen dioxide gas selected for use is not critical. Thus, a feed gas containing greater or lesser amounts of nitrogen dioxide than that specified above may be employed without substantial penalty as to the ammonium nitrate yields obtained. The gaseous stream containing nitrogen dioxide employed may additionally contain gases such as oxygen, nitrogen, nitric oxide and carbon dioxide, which do not react in a competing fashion with the ammonium chloride or nitrogen dioxide to adversely affect the yields of ammonium nitrate obtained.

The concentration of ammonium chloride present in the liquid dispersing medium is not critical. However, ammonium chloride is generally admixed with the selected dispersing medium in an amount sufficient to provide an ammonium chloride concentration of about 1 to about 50 percent by weight, more preferably from about 10 to 40 percent by weight, and most preferably from about 20 to 30 percent by weight. While the ammonium chloride is preferably added to the dispersing medium as solids having a particle size substantially passing through 20 mesh screen (U.S.Sieve), such granulation is not critical. The purity of the ammonium chloride which is employed is not critical and ammonium chloride containing 0.5 percent by weight NaCl as is obtained as a by-product from the Solvay Process for production of soda ash has been found quite satisfactory.

Presence of water in the liquid dispersing medium is required to achieve conversion of ammonium chloride to ammonium nitrate in our process. Hence, the liquid dispersing medium should contain water in an amount of from about 1 to 40 percent by weight, more preferably from about 2 to 15 percent by weight, and most preferably from about 3 to 10 percent by weight, based on the weight of ammonium chloride added for reaction to the liquid dispersing medium. It has been found that less than about 1 percent by weight of water does not effect the high conversion of ammonium nitrate which is desired, and greater than about 20 percent by weight water results in an accelerated rate of decomposition of the ammonium nitrate product to $N_2O$, $H_2O$ and $N_2$ and results in accelerated corrosion rate of stainless steel. However, water concentrations in the liquid dispersing medium of as much as 40 percent by weight may be employed where corrosion-resistant equipment is utilized. The desired amount of water may be added directly to the liquid dispersing medium. However, it is preferred to dampen the ammonium chloride solids with the desired amount of water prior to the addition of the solids to the liquid dispersing medium.

The gaseous stream containing nitrogen dioxide and the ammonium chloride dispersed in the liquid dispersing medium may be contacted at any temperature up to the boiling point of the liquid dispersing medium. Thus, the precise temperature which may be employed will depend on the pressure, the particular liquid dispersing medium employed, and other factors. Generally, however, contact of the ammonium chloride with the gaseous stream containing nitrogen dioxide is made at a temperature of from about 10° to 50°C., preferably from about 20° to 30°C. While temperatures above about 50°C. may be employed, they are not preferred since the product ammonium nitrate decomposes at an uneconomical rate above about 50°C. The pressure at which the gaseous stream and the ammonium chloride are contacted is not critical and atmospheric pressure is satisfactory.

The gaseous stream containing nitrogen dioxide and ammonium chloride may be contacted in accordance with the present invention in either a batch or a continuous process, and the gaseous stream containing the nitrogen dioxide may be introduced to the liquid dispersing medium containing the ammonium chloride at a wide variety of flow rates. However, rapid flow rates are preferred to decrease reaction times, thereby minimizing decomposition of the product ammonium nitrate. The gaseous stream containing the nitrogen dioxide is preferably introduced into the liquid dispersing medium at a rate of from about 0.5 to 4 moles $NO_2$ per hour, and most preferably from about 0.25 to 2 moles $NO_2$ per hour per mole of ammonium chloride.

During introduction of the gaseous stream containing nitrogen dioxide to the liquid dispersing medium for production of ammonium nitrate, the liquid is preferably agitated as by stirring or other agitation means to evenly disperse the solids in the liquid medium to provide for more intimate contact of the ammonium chloride and nitrogen dioxide gas. The speed of agitation of the liquid medium, however, is not critical, and the obtainment of a homogeneous dispersion is not required. The gaseous stream containing nitrogen dioxide may be introduced to the liquid medium employing any conventional method used to effect gas/liquid contact. For example, the gaseous stream containing nitrogen dioxide gas may be sparged into the liquid dispersion medium employing a fritted glass sparger possessing a plurality of gas openings, or the gaseous stream may be introduced to the medium via a single feed pipe.

The time required for conversion of substantially all of the ammonium chloride to ammonium nitrate will, of course, vary, depending upon the $NO_2$ flow rates, the $NO_2$ concentration in the gaseous stream, the ammonium chloride concentration in the liquid dispersing medium, the particular liquid dispersion medium selected for use and other factors, but will generally be from about 0.3 to 5 hours, and more preferably from about 0.5 to about 3 hours. It has been found that greater than about 92 percent conversion of ammonium chloride to ammonium nitrate is difficult to achieve due to the tendency of ammonium nitrate in the presence of chloride ions to decompose to water, nitrogen and $N_2O$. Thus, under optimum conditions from about 8 to 10 percent of the ammonium nitrate produced will undergo decomposition to the above by-products.

Any standard vessel may be employed to provide contact between the nitrogen dioxide and the ammonium chloride. While the material of construction is not critical, stainless steel is preferred for that portion of the vessel in contact with the liquid dispersing medium, with a substantially inert material such as No. 316 stainless steel being employed for that portion of the apparatus coming into contact with the wet exit gases, which contain NOCl.

Product solution containing ammonium nitrate together with any unreacted ammonium chloride suspended in the liquid dispersing medium may be continuously withdrawn from the vessel wherein the ammonium chloride is contacted with the nitrogen dioxide gas. The product solution may be passed to a solids separation apparatus for removal of ammonium nitrate and ammonium chloride solids from the liquid medium, which may then be recycled to the treatment vessel after addition thereto of additional ammonium chloride. The solids separation apparatus may be any of the apparatus conventionally employed to separate solids from liquids, such as for example a filtration device or centrifuge. Alternatively, the solids may be allowed to settle and the liquid medium may be decanted to provide the solids as residue. Further, the liquid dispersion medium containing the solids may be distilled to produce the desired solids as residue, and the distillate may then be recovered as by condensation and recycled to the process. When the quantity of water employed requires recovery therefrom of dissolved ammonium nitrate and/or ammonium chloride for economy of operation, the liquid from which the ammonium nitrate and ammonium chloride solids have been recovered may be treated by conventional means to separate the aqueous phase from the organic, liquid dispersing medium and to recover dissolved ammonium nitrate and/or ammonium chloride from the aqueous phase, as by distillation.

The gases evolved as a result of the present process may be recovered by known means. Thus, the exit gases which contain the gaseous products formed in the reaction zone together with any unreacted nitrogen dioxide and other unabsorbed components of the gaseous feed may be passed to a reflux condenser or fractionating tower wherein the nitrogen dioxide vapors are condensed and returning to the reaction zone, with reaction products, such as chlorine, being passed to a suitable point for their recovery. In addition, the nitrosyl chloride, formed as by-product, may be suitably treated in accordance with conventional techniques to form chloride and nitrogen dioxide which may then be recycled to the process.

The process of the present invention may be further illustrated by reference to the following examples.

EXAMPLE 1

53.5 Grams of ammonium chloride which is dampened with 1 gram of water (i.e., about 1.8 weight percent water) is introduced into a vessel containing 20 milliliters n-hexane as liquid dispersing medium maintained at a temperature of from about 20° to 30°C. and agitated by a stirrer being rotated at a speed of 700 to 1000 rpm. A gaseous steam containing 100 percent by volume nitrogen dioxide is introduced through a delivery tube at a rate of about 30 to 40 grams $NO_2$ per hour. At periodic intervals, samples are withdrawn from the liquid dispersing medium, the solids are separated, and the ammonium nitrate content of the solids is determined. The results thus obtained are set forth in Table I below:

Table I

| Time (hours) | % by weight ammonium nitrate in the solids |
|---|---|
| 1.25 | 51.8 |
| 2.5 | 74.8 |
| 3.5 | 98.9 |

At the conclusion of four hours, the introduction of the nitrogen dioxide gas is discontinued and the liquid medium is filtered to recover the solids therefrom. The solids thus obtained are found to weigh 72 grams and to consist of 100 percent ammonium nitrate, thereby providing an ammonium nitrate yield of 90 percent, based on 100 percent theoretical conversion of ammonium chloride.

EXAMPLE 2

The procedure of Example 1 is repeated employing a gaseous stream containing 10 percent by volume nitrogen dioxide and 90 percent by volume nitrogen, and similar results are obtained, In a second run, a gaseous stream containing 10 percent nitrogen dioxide and 90 percent air is employed and similar results are obtained.

EXAMPLES 3–10

Following the procedure set forth in Example 1, 53.5 grams ammonium chloride is dampened with selected amounts of water and placed in 200 milliliters of the selected dispersing medium. Pure nitrogen dioxide gas is introduced at a preselected flow rate and the liquid mixture agitated as per Example 1. At the end of a selected period of time, the solids present in the liquid medium are recovered by filtration and analyzed for their ammonium nitrate content. The results of the above experiments are summarized in Table II below.

nitrate recovered from that run which employed −80 mesh starting material and with 74 grams ammonium nitrate recovered from that run which employed +80 mesh starting material. Thus, whereas the use of the finer particle size ammonium chloride resulted in an ammonium nitrate yield of 95% of theoretical, the use of the +80 mesh ammonium chloride effected an ammonium nitrate yield of 92.5 percent.

Although certain preferred embodiments of the invention have been disclosed for purpose of illustration, it will be evident to one skilled in the art that various changes and modifications may be made therein without departing from the scope and spirit of the invention.

We claim:

1. A process for the production of ammonium nitrate which comprises contacting ammonium chloride with a Table II

| Example | Liquid Dispersing Medium | Weight Percent Water* | $NO_2$ Flow Rate (Grams $NO_2$ per hour) | Reaction Time (Hours) | Weight Percent $NH_4Cl$ Reacted | Percent Yield $NH_4NO_3$ |
|---|---|---|---|---|---|---|
| 3 | $CH_2Cl_2$ | 2 | 92 | 5.5 | 99 | 92 |
| 4 | " | 5 | 92 | 0.3 | 99 | 90 |
| 5 | " | 10 | 92 | 0.5 | 100 | 92 |
| 6 | " | 20 | 92 | 0.5 | 100 | 86 |
| 7 | " | 40 | 92 | 0.5 | 100 | 72 |
| 8 | n-heptane | 0 | 92 | 2.3 | 12 | — |
| 9 | " | 2 | 92 | 4 | 99 | 91 |
| 10 | " | 5 | 92 | 0.5 | 100 | 92 |

*Basis weight of ammonium chloride solid

EXAMPLE 11

Following the procedure set forth in Example 1, 53.5 grams of $NH_4Cl$ is dampened with 5 percent by weight of water and the resulting dampened solids placed in 200 milliliters $CH_2Cl_2$ as liquid dispersing medium. Pure nitrogen dioxide gas is introduced into the liquid at a rate of 108 grams $NO_2$ per hour and the liquid which is agitated at a speed of 200 rpm is maintained at a temperature of about 20° to 30°C. After a period of about 3 hours 76 grams of solids are recovered from the liquid medium by filtration. The recovered solids are found to contain 99.2 weight percent ammonium nitrate, thereby providing an ammonium nitrate yield of about 95 percent.

EXAMPLE 12

To determine the effect which particle site of the ammonium chloride starting material has upon the reaction rate and the yield of ammonium nitrate, 107 grams of ammonium chloride are divided into two 53.5 gram portions. The first portion is ground to a fineness of +80 (U.S.) mesh and the second to a fineness of −80 mesh (U.S.). In separate runs each portion is wetted with 5 grams of water (9.35 percent by weight) and then introduced into separate 200 milliliter portions of $CH_2Cl_2$ as liquid dispersing medium which is maintained at a temperature of 26°C. and at atmospheric pressure. While the liquid is agitated by a stirrer at a speed of 200 rpm, pure nitrogen dioxide gas is introduced into each liquid medium at a rate of 128 grams $NO_2$ per hour for a period of one hour. At the end of the one hour period, the solids are recovered from the liquid medium and are found to contain 100 percent pure ammonium nitrate, with 76 grams ammonium gaseous stream containing nitrogen dioxide in the presence of an inert liquid dispersing medium in the presence of about 1 to 40 weight percent water, based on the ammonium chloride content, and under reaction conditions sufficient to effect conversion of said ammonium chloride into ammonium nitrate, and recovering said ammonium nitrate.

2. The process according to claim 1 wherein the inert liquid dispersing medium is a member selected from the group consisting of halogenated hydrocarbons, aliphatic hydrocarbons, aromatic hydrocarbons, ligroin and mixtures thereof.

3. The process according to claim 1 wherein the liquid reaction medium is selected from the group consisting of chlorinated, chlorofluorinated and fluorinated aliphatic hydrocarbons, aliphatic hydrocarbons having from 6 to 12 carbon atoms per molecule, benzene, alkyl-substituted benzenes having a total of from 7 to 18 carbon atoms per molecule, petroleum ether and mixtures thereof.

4. The process according to claim 1 wherein the liquid dispersing medium contains water in an amount of from about 2 to 15 weight percent, based on the ammonium chloride content.

5. The process according to claim 1 wherein said ammonium chloride and said gaseous stream containing nitrogen dioxide are contacted at a temperature of from about 10° to 50°C.

6. The process according to claim 1 wherein the liquid dispersing medium contains ammonium chloride in an amount of from about 1 to 50 percent by weight.

7. The process according to claim 1 wherein the liquid dispersing medium is agitated.

* * * * *